United States Patent
Grave

[11] Patent Number: 6,039,451
[45] Date of Patent: Mar. 21, 2000

[54] SCULPTURED TRANSFLECTOR FOR DUAL MODE ACTIVE MATRIX LIQUID CRYSTAL DISPLAY BACKLIGHT

[75] Inventor: Duane A. Grave, Marion, Iowa

[73] Assignee: Rockwell Science Center, Inc., Thousand Oaks, Calif.

[21] Appl. No.: 09/090,376

[22] Filed: Jun. 4, 1998

[51] Int. Cl.[7] ............................... G01D 11/28
[52] U.S. Cl. .................. 362/29; 362/30; 362/471; 362/561; 362/293; 362/236; 362/225; 362/33
[58] Field of Search ............... 362/29, 30, 471, 362/561, 293, 236, 225, 33

[56] References Cited

U.S. PATENT DOCUMENTS

| | | | |
|---|---|---|---|
| 4,974,122 | 11/1990 | Shaw | 362/31 |
| 5,143,433 | 9/1992 | Farrell | 362/29 |
| 5,211,463 | 5/1993 | Kalmanash | 362/26 |
| 5,420,481 | 5/1995 | McCanney | 315/291 |
| 5,661,578 | 8/1997 | Habing et al. | 362/30 |
| 5,886,681 | 3/1999 | Walsh et al. | 362/29 |

OTHER PUBLICATIONS

Duane A. Grave, Scot Olson and Philip Brown, Cockpit Displays II, Proceedings—SPIE—The International Society for Optical Engineering, *Enhanced AMLCD and Backlight for Extended Luminance Range and Sunlight Readability*, vol. 2462, Apr. 19–21, 1995.

*Primary Examiner*—Sandra O'Shea
*Assistant Examiner*—Ronald E. DelGizzi
*Attorney, Agent, or Firm*—Kyle Eppele; James P. O'Shaughnessy

[57] ABSTRACT

Disclosed are a backlight and avionics display using the same to provide light to a liquid crystal display (LCD) device. In the backlight, a day mode light source positioned on a first side of the LCD device and adapted to provide a first source of light for use by the LCD device during day mode operations. A night mode light source positioned on the first side of the LCD device is adapted to provide a second source of light for use by the LCD device during night mode operations. A sculptured transflector positioned between the day mode light source and the night mode light source has, at a first side adjacent the day mode light source, a transflective material and a plurality of arcuate or parabolic surfaces in order to maximize a percentage of light from the day mode light source which is reflected toward the LCD device.

20 Claims, 3 Drawing Sheets

SCULPTURED TRANSFLECTOR FOR DUAL MODE ACTIVE MATRIX LIQUID CRYSTAL DISPLAY BACKLIGHT

FIELD OF THE INVENTION

The present invention relates to backlighting liquid crystal displays (LCDs) in day and night mode (i.e., dual mode) conditions. More particularly, the present invention relates to dual mode LCDs which utilize a sculptured transflector device to enhance day and night mode operation.

BACKGROUND OF THE INVENTION

Active matrix (AM) and other types of LCDs are increasingly being used as display devices in aircraft. To accommodate low level night operation and high ambient sunlight conditions, an extremely large backlight dimming range is necessary. A desired luminance range may be as large 0.03 FtL (Foot-lambarts) to 200 FtL (6667:1) over the display field of view. This is a much larger range than previously exhibited by typical hot cathode or cold cathode fluorescent lamps. Previous backlight designs for backlighting LCDs have exhibited a limited luminance range of only approximately 2000:1 for hot cathode lamps and 500:1 for cold cathode lamps. Conventional backlight designs cannot typically achieve the low end of the luminance range without the fluorescent lamp extinguishing or flickering.

Typical AM-LCD backlight and display systems in military applications include an optical filter to enhance display performance while pilots are utilizing night vision imaging systems (NVIS). However, inclusion of these films or devices in the optical stack decreases the maximum luminance of the display in day mode operations. Since the difficulty in providing the extremely large dimming range occurs primarily at very low luminance levels, a backlight design capable of achieving a very low luminance uniform output without significantly affecting the maximum luminance level would be a significant improvement.

SUMMARY OF THE INVENTION

Disclosed are a backlight and avionics display using the same to provide light to a liquid crystal display (LCD) device. In the backlight, a day mode light source is positioned on a first side of the LCD device and adapted to provide a first source of light for use by the LCD device during day mode operations. A night mode light source also positioned on the first side of the LCD device is adapted to provide a second source of light for use by the LCD device during night mode operations. A sculptured transflector positioned between the day mode light source and the night mode light source has, at a first side adjacent the day mode light source, a transflective material and multiple arcuate or parabolic surfaces in order to maximize a percentage of light from the day mode light source which is reflected toward the LCD device. During night mode operations, a small percentage of the light from the night mode light source is transmitted through the sculptured transflector, thereby helping to achieve uniform very low luminance levels. NVIS filters are positioned adjacent the night mode light source such that they do not filter light from the day mode light source.

DETAILED DESCRIPTION OF THE PREFERRED EMBODIMENTS

Figure 1:
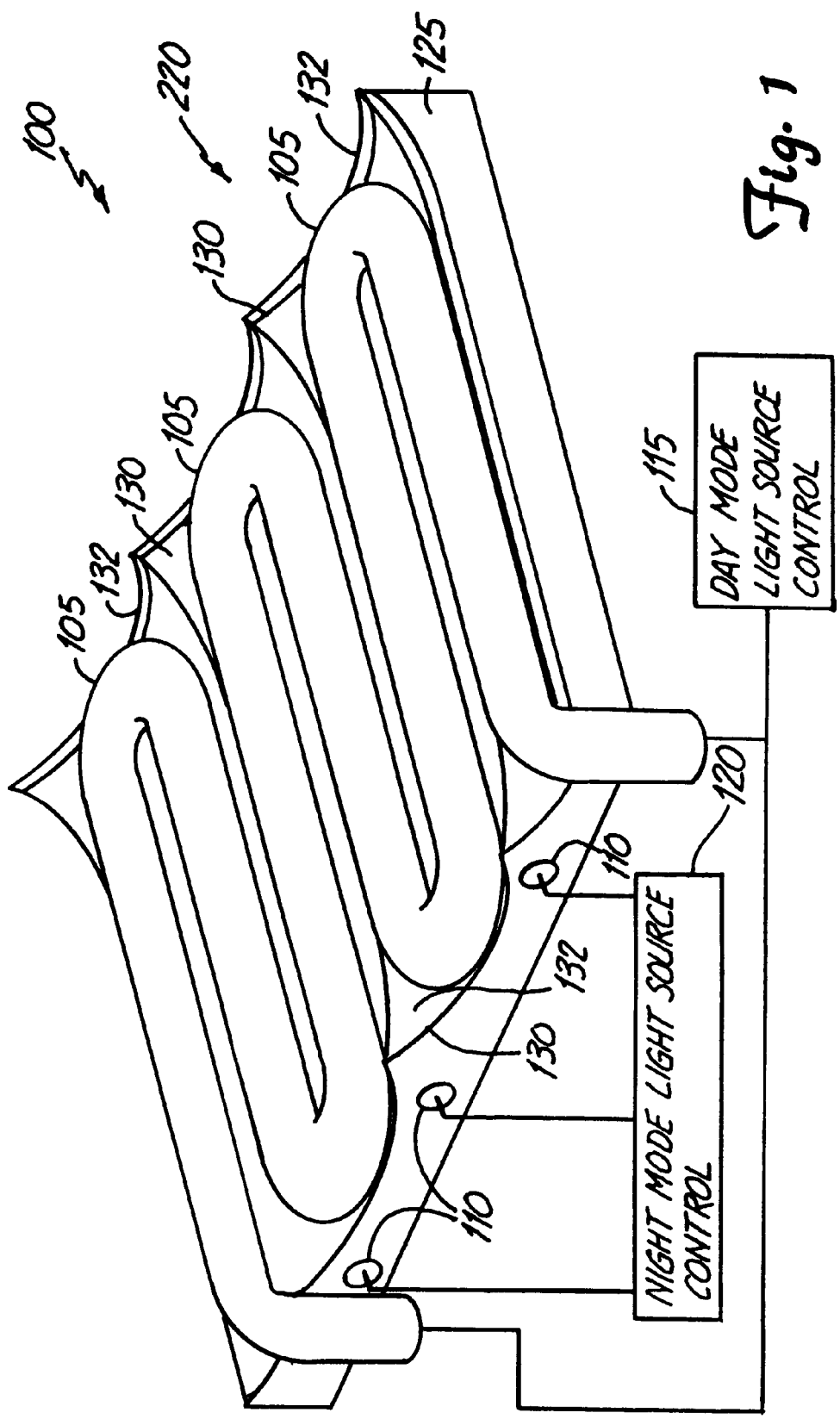
FIG. 1 is a diagrammatic perspective view illustrating a sculptured transflector backlight, which is particularly adapted for use in dual mode AM-LCDs, in accordance with embodiments of the present invention.

FIG. 1 is a diagrammatic perspective view illustrating backlight 100 in accordance with embodiments of the present invention. Backlight 100 includes day mode light source 105, night mode light source 110, day mode light source control circuitry 115, night mode light source control circuitry 120, and sculptured transflector 125. Day mode light source 105 can be, for example, a serpentine or other shaped hot or cold cathode fluorescent lamp. However, other types of light sources can be used to provide day mode light source 105. For example, day mode light source 105 can be incandescent lamps or light emitting diodes (LEDs). Day mode light source 105 is under the control of day mode light source control circuitry 115 which controls the power provided to light source 105 during day mode operations. Frequently, during day mode operations, it is an objective of backlight 100 to achieve a maximum, uniform luminance intensity from day mode light source 105.

Night mode light source 110 can likewise be a variety of different types of light sources, including hot or cold cathode fluorescent lamps, incandescent lamps, electroluminescent lamps, or LEDs. Under the control of night mode light source control circuitry 120, night mode light source 110 provides a source of light for displaying information on an LCD during night mode operations. Sculptured transflector 125 is at least partially positioned between day mode light source 105 and night mode light source 110 in embodiments of the present invention. In the embodiment illustrated in FIG. 1, night mode light source 110 is embedded within sculptured transflector 125. However, in other embodiments, night mode light source 110 is positioned behind sculptured transflector 125, opposite day mode light source 105. In either embodiment, night mode light source 110 is filtered with a night vision imaging system (NVIS) filter of the type which is known in the art. However, unlike conventional NVIS filtered backlights, the NVIS filters used in the backlights and display devices of the present invention are positioned between night mode light source 110 and day mode light source 105. Positioning the NVIS filter in this location allows NVIS filtering of the night mode light source, while insuring that the day mode light source is not NVIS filtered and thus enhancing day mode luminance.

Sculptured transflector 125 is preferably formed from a polycarbonate or transparent plastic material. On first side 220 of sculptured transflector 125 adjacent day mode light source 105, transflector 125 forms multiple arcuate or parabolic surfaces 130. On surfaces 130 is a coating or film 132 of transflective material, such as MELANEX™. This coating can also be a common paint.

Transflective coating or film 132 reflects light from day mode light source 105. As can be seen more clearly in FIG. 2, the multiple arcuate or parabolic surfaces 130 and the transflective material or coating 132 together maximize a percentage of light from day mode light source 105 which is reflected toward an LCD device. Transflective film or coating 132 transmits a small percentage, for example no greater than about 10 percent, of light generated by night mode light source 110. The remaining light from night mode light source 110 is absorbed by transflective coating or material 132.

Figure 2:
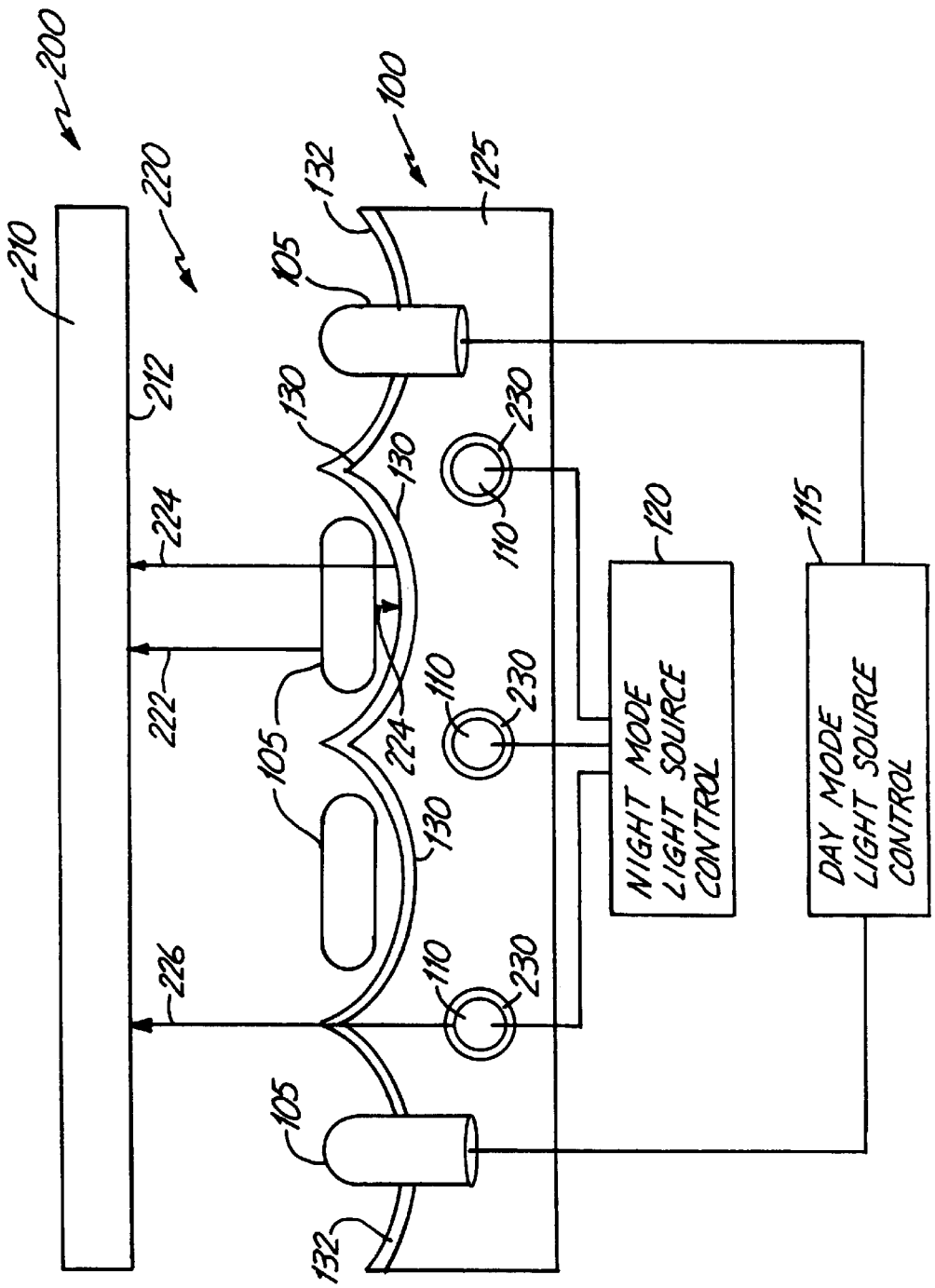
FIG. 2 is a diagrammatic top view illustrating a display device utilizing the sculptured transflector backlight shown in FIG. 1.

FIG. 2 illustrates avionics display 200 which includes backlight 100 and LCD device 210. Backlight 100 is positioned adjacent first side 212 of LCD device 210, and provides both day and night mode sources of light for use by LCD device 210 in displaying information to a pilot or other user of display 200. During day mode operations in which high backlight luminance levels are desirable, day mode light source control circuitry 115 controls day mode light source 105 to produce a desired luminance intensity level for use in backlighting LCD device 210. Day mode light source 105 generates both light 222 in the general direction of LCD device 210, and light 224 in the general direction of sculptured transflector 125. With the inclusion of transflective material or coating 132 on surfaces 130 of transflector 125, light 224 generated by day mode light source 105 is reflected back toward LCD device 210 in order to maximize the luminance intensity and/or uniformity.

One significant advantage of the present invention is the fact that, unlike in previous NVIS filtered backlights, none of the light generated by day mode light source 105 is NVIS filtered. With the present invention, collimators and NVIS filters which are normally included in the optical stack up of LCD device 210 can be relocated such that the day mode light source luminance levels are increased and the power required to generate the light is reduced. Likewise, inclusion of sculptured transflector 125 increases the uniformity of light provided by day mode light source 105.

During night mode operations in which extremely low backlight luminance levels are desired, day mode light source control circuitry 115 minimizes the light output from day mode light source 105, and night mode light source control circuitry 120 controls night mode light source 110 to achieve a desired luminance level. In the embodiment illustrated in FIG. 2 in which night mode light source 110 is embedded within sculptured transflector 125, NVIS filters 230 are likewise embedded within sculptured transflector 125 in a position relative to light source 110 which will allow NVIS filtering to occur. NVIS filters 230 will typically include a dyed glass, with an NVIS coating applied. However, NVIS filters 230 can be formed from only dyed glass or from only a coating. Also, NVIS filters 230 can be formed from plastic. In either case, NVIS filters 230 transmit only portions of light 226 generated by night mode light source 110 which have a wavelength of less than about 630 nanometers.

By removing NVIS filters 230 from the optical stack up in front of the day lamp 105, night mode light source 110 can be NVIS filtered as desired, without adversely affecting the performance of backlight 100 during day mode operations. Light 226 generated by night mode light source 110 toward LCD device 210 is at least partially transmitted through transflective film or coating 132. In preferred embodiments of the present invention, transflective film 132 of sculptured transflector 125, alone or in combination with NVIS filter 230, transmits no more than about 10 percent of light generated by night mode light source 110. Thus, the extremely low luminance levels typically desired during night mode operations can be more readily achieved.

In a more particular embodiment, only between about five and about eight percent of light from night mode light source 110 is transmitted.

Figure 3:
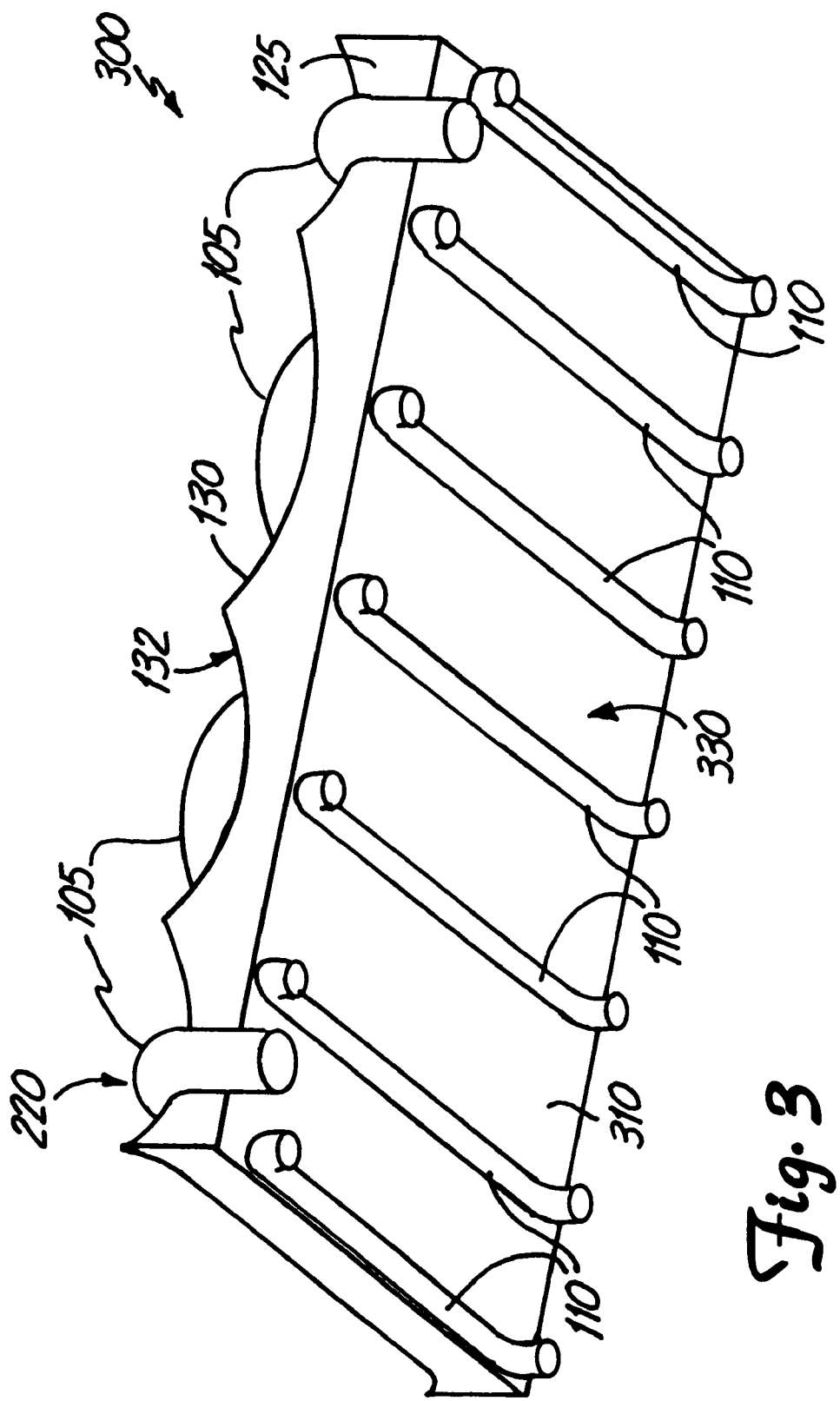
FIG. 3 is diagrammatic rear view illustrating a second embodiment of the sculptured transflector backlight of the present invention.

FIG. 3 is an alternate embodiment of the backlight of the present invention. Backlight 300 can be used in place of backlight 100 in display 200 illustrated in FIG. 2. Backlight 300 illustrated in FIG. 3 differs from backlight 100 illustrated in FIG. 1 primarily only in relation to the placement of night mode light source 110 and NVIS filters 230. As illustrated in FIG. 3, night mode light source 110 of backlight 300 is not embedded within sculptured transflector 125. Instead, night mode light source 110 is positioned adjacent side 310 of sculptured transflector 125, opposite day mode light source 105. In this position, sculptured transflector 125 is located substantially entirely between day mode light source 105 and night mode light source 110. With night mode light source 110 positioned adjacent side 310 of sculptured transflector 125, the NVIS filter can be relocated as well. As illustrated in FIG. 3, NVIS filter 330 is applied to side 310 of sculptured transflector 125, and remains between transflector 125 and night mode light source 110. In this embodiment the NVIS filter can be a flat sheet.

Although the present invention has been described with reference to preferred embodiments, workers skilled in the art will recognize that changes may be made in form and detail without departing from the spirit and scope of the invention.

What is claimed is:

1. An avionics display for use in the cockpit of an aircraft, the display comprising:

a liquid crystal display device;

a day mode light source positioned on a first side of the liquid crystal display device and adapted to controllably provide a first source of light for use by the liquid crystal display device in displaying information during day mode operations;

a night mode light source positioned on the first side of the liquid crystal display device and adapted to controllably provide a second source of light for use by the liquid crystal display device in displaying information during night mode operations; and a sculptured transflector positioned between the day mode light source and the night mode light source, a first side of the sculptured transflector adjacent the day mode light source having a transflective material thereon and forming a plurality of arcuate surfaces, wherein the transflective material and the plurality of arcuate surfaces are adapted to maximize a percentage of light from the day mode light source which is reflected toward the liquid crystal display device.

2. The avionics display device of claim 1, and further comprising a night vision imaging system (NVIS) filter positioned between the night mode light source and the day mode light source such that the NVIS filter filters the second source of light provided by the night mode light source during night mode operations, but does not filter the first source of light provided by the day mode light source during day mode operations.

3. The avionics display device of claim 2, wherein the NVIS filter absorbs substantially all light from the night mode light source having a wavelength of greater than about 630 nanometers.

4. The avionics display of claim 3, wherein the sculptured transflector absorbs at least about 90 percent of the second source of light from the night mode light source during night mode operations.

5. The avionics display device of claim 4, wherein the night mode light source is embedded within the sculptured transflector.

6. The avionics display device of claim 5, wherein the NVIS filter is embedded within the sculptured transflector.

7. The avionics display device of claim 6, wherein the NVIS filter includes a coating on the night mode light source.

8. The avionics display device of claim 4, wherein the night mode light source is positioned adjacent to a second side of the sculptured transflector.

9. The avionics display device of claim 8, wherein the NVIS filter includes a coating on the second side of the sculptured transflector.

10. An avionics display for use in the cockpit of an aircraft, the display comprising:

a liquid crystal display device;

a day mode light source positioned on a first side of the liquid crystal display device and adapted to controllably provide a first source of light for use by the liquid crystal display device in displaying information during day mode operations;

a night mode light source positioned on the first side of the liquid crystal display device and adapted to controllably provide a second source of light for use by the liquid crystal display device in displaying information during night mode operations;

a sculptured transflector positioned between the day mode light source and the night mode light source, a first side of the sculptured transflector adjacent the day mode light source having a transflective material thereon and forming a plurality of parabolic surfaces, wherein the transflective material and the plurality of parabolic surfaces are adapted to maximize a percentage of the first source of light from the day mode light source which is reflected toward the liquid crystal display device; and a night vision imaging system (NVIS) filter positioned between the night mode light source and the day mode light source such that the NVIS filter absorbs substantially all portions of the second source of light provided by the night mode light source which have a wavelength of greater than about 630 nanometers, but does not absorb the first source of light provided by the day mode light source.

11. The avionics display of claim 10, wherein the sculptured transflector absorbs at least about 90 percent of the second source of light from the night mode light source during night mode operations.

12. The avionics display device of claim 10, wherein the night mode light source is embedded within the sculptured transflector.

13. The avionics display device of claim 12, wherein the NVIS filter is embedded within the sculptured transflector and includes a coating on the night mode light source.

14. The avionics display device of claim 10, wherein the night mode light source is positioned adjacent a second side of the sculptured transflector, and wherein the NVIS filter includes a coating on the second side of the sculptured transflector.

15. A backlight for backlighting a liquid crystal display, the backlight comprising:

a day mode light source adapted to controllably provide a first source of light for use by the liquid crystal display device in displaying information during day mode operations;

a night mode light source adapted to controllably provide a second source of light for use by the liquid crystal display device in displaying information during night mode operations;

a sculptured transflector positioned between the day mode light source and the night mode light source, a first side of the sculptured transflector adjacent the day mode light source having a transflective material thereon and forming a plurality of arcuate surfaces, wherein the transflective material and the plurality of arcuate surfaces are adapted to maximize a percentage of the first source of light from the day mode light source which will be reflected toward the liquid crystal display device; and a night vision imaging system (NVIS) filter positioned between the night mode light source and the day mode light source such that the NVIS filter absorbs substantially all portions of the second source of light provided by the night mode light source which have a wavelength of greater than about 630 nanometers, but does not absorb the first source of light provided by the day mode light source.

16. The backlight of claim 15, wherein the sculptured transflector absorbs at least about 90 percent of the second source of light from the night mode light source during night mode operations.

17. The backlight of claim 15, wherein the night mode light source is embedded within the sculptured transflector.

18. The backlight of claim 17, wherein the NVIS filter is embedded within the sculptured transflector and includes a coating on the night mode light source.

19. The backlight of claim 15, wherein the night mode light source is positioned adjacent to a second side of the sculptured transflector, and wherein the NVIS filter includes a coating on the second side of the sculptured transflector.

20. The backlight of claim 15, wherein the sculptured transflector is formed from a polycarbonate material.

* * * * *